(12) United States Patent
Chen

(10) Patent No.: US 7,093,698 B1
(45) Date of Patent: Aug. 22, 2006

(54) SHOCK-ABSORBING DEVICE FOR A MOTORCYCLE

(76) Inventor: Kun-Tien Chen, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 11/135,937

(22) Filed: May 25, 2005

(51) Int. Cl.
*B62K 21/14* (2006.01)

(52) U.S. Cl. .................. 188/379; 267/153; 74/551.2

(58) Field of Classification Search ............. 267/140, 267/140.12, 279–294, 153; 280/275–276; 403/104, 265, 344; 188/379; 74/551.2
See application file for complete search history.

(56) References Cited

U.S. PATENT DOCUMENTS

| | | | | |
|---|---|---|---|---|
| 3,881,711 A | * | 5/1975 | Lemaitre | 267/282 |
| 4,616,949 A | * | 10/1986 | Kellner | 403/104 |
| 4,702,346 A | * | 10/1987 | Uno et al. | 181/207 |
| 4,768,761 A | * | 9/1988 | Kramer | 267/154 |
| 5,404,769 A | * | 4/1995 | Kao | 74/551.3 |
| 5,934,697 A | * | 8/1999 | McAndrews | 280/276 |
| 6,209,858 B1 | * | 4/2001 | Fujii | 267/201 |
| 6,481,700 B1 | * | 11/2002 | Fujii | 267/140.11 |
| 2003/0226421 A1 | * | 12/2003 | Livingston | 74/551.1 |

* cited by examiner

*Primary Examiner*—Christopher P. Schwartz

(57) ABSTRACT

A shock-absorbing device for a motorcycle comprises a tubular cushion made of soft materials and a cover body made of hard materials. The shock-absorbing device is mounted on the middle section of a motorcycle handlebar, whereby the recoil force by a bumpy road on the motorcycle will be transmitted and absorbed by the front shock absorbing springs as well as the shock-absorbing device of the motorcycle handlebar. Further, the two ends of the motorcycle handlebar are respectively provided with rubber handgrips; the trio forming a three-stage type shock-absorbing device.

7 Claims, 5 Drawing Sheets

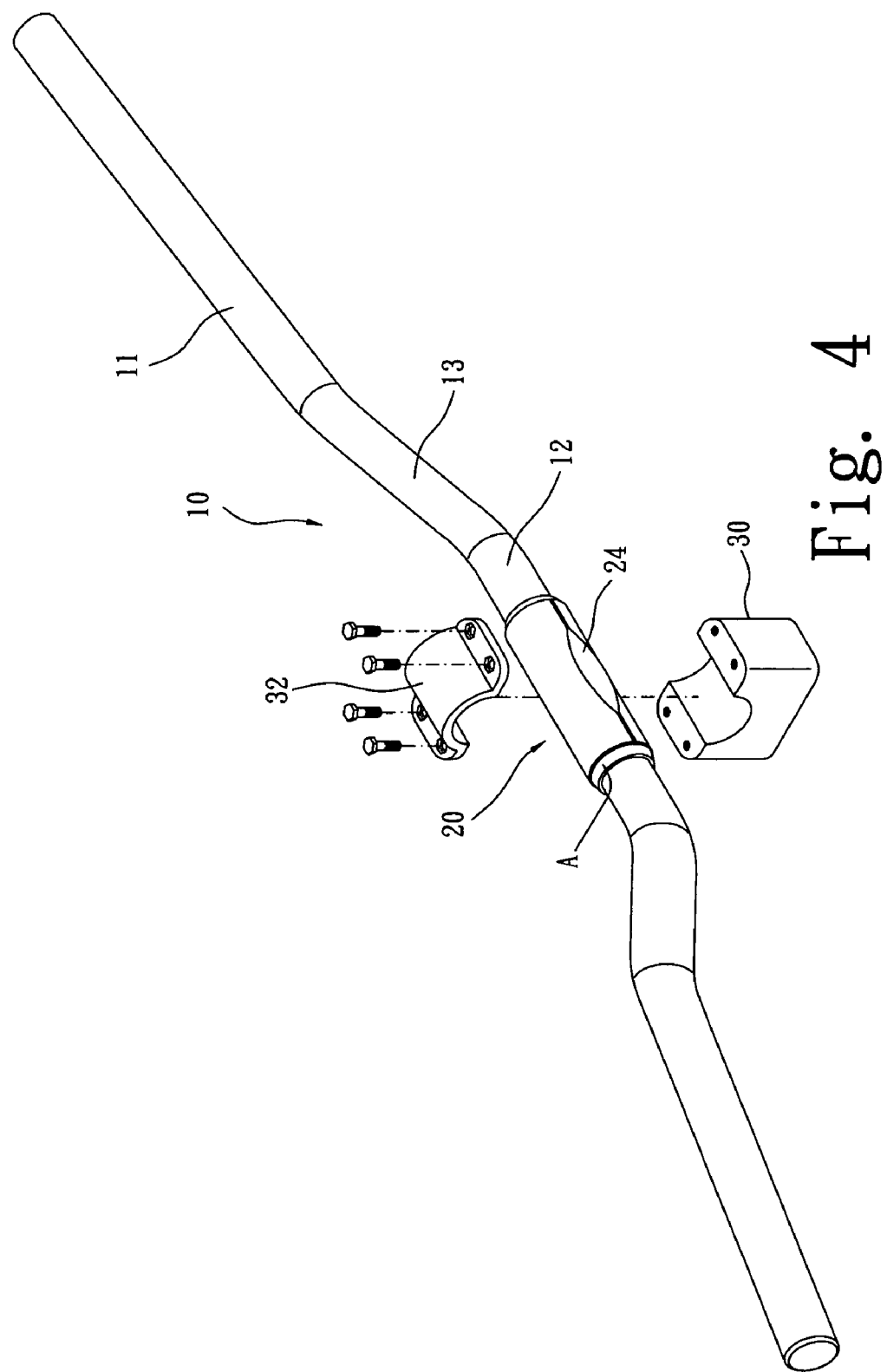

SHOCK-ABSORBING DEVICE FOR A MOTORCYCLE

FIELD OF THE INVENTION

The present invention relates to shock-absorbing devices for motorcycles, and more particularly to a shock-absorbing device for a motorcycle that is mounted on the motorcycle handlebar of a motorcycle.

BACKGROUND OF THE INVENTION

A motorcycle is generally driven forward by the rear wheel, the front wheel is driven by a transmission means and the motorcycle handlebar above which is used to control the direction of the motorcycle. The shock due to the recoil force by a bumpy road on the motorcycle will be transmitted and absorbed by the handgrips mounted at two ends of the motorcycle handlebar and then the arms holding the handgrips.

To lessen the resilient force on the arms, which can cause pains if the road is rather bumpy, the frame of the front wheel of a conventional motorcycle is equipped with a pair of shock absorbing springs, and the motorcycle handlebar is provided with a pair of rubber handgrips. Thereby, a two-stage shock-absorbing device is achieved.

However, the forked frame of the front wheel can be further provided with a shock absorbing spring and the rubber handgrips can be further reinforced. These additions will improve the shock absorbing effect.

Nevertheless, the shock-absorbing device using the shock absorbing springs in the front forked frame and the rubber handgrips is not sufficient when the recoil force from the bumpy road is too great, which will inevitably cause pains in a rider's arms. This will affect the stability and the control of the rider.

In the worst case, the resilient force by the road may cause a loss of control of a rider over the motorcycle direction. Therefore, the two-stage shock-absorbing device can still be improved.

Further, the connection of a motorcycle handlebar and a front forked frame is realized through a middle section of the motorcycle handlebar being mounted with the front forked frame by a left block and a right block. The left block and the right block are combined, which form a middle platform. The middle bottom part of the platform is provided with a hole for connecting the front forked frame, whereby the motorcycle handlebar and the front forked frame form a shock transport device.

However, the central dipped section of the motorcycle handlebar mounted on the front forked frame should sustain not only the recoil force from the latter due to a bumpy road but also the downward force exerted by the hands that hold the former. The central dipped section of the motorcycle handlebar does not have any shock-absorbing device, a problem probably causing structural damages in the connection section.

As described above, the shock absorbing effect provided by a pair of rubber handgrips on the motorcycle handlebar is not sufficient to protect a rider from disturbances on a bumpy road.

SUMMARY OF THE INVENTION

Accordingly, the primary objective of the present invention is to provide a shock-absorbing device for a motorcycle comprising a tubular cushion made of soft materials and a cover body made of hard materials. The shock-absorbing device is mounted on the middle section of a motorcycle handlebar, whereby the recoil force by a bumpy road on the motorcycle will be transmitted and absorbed by the front shock absorbing springs as well as the shock-absorbing device of the motorcycle handlebar. The two ends of the motorcycle handlebar are respectively provided with rubber handgrips. The trio forming a three-stage type shock-absorbing device.

In contrast to the shock-absorbing devices of the prior art, in which only the front shock absorbing springs and the rubber handgrips form a two-stage shock-absorbing device. The two-stage shock-absorbing device may not efficiently absorb the shock from a bumpy road and cause a safety problem for a motorcycle rider.

To achieve above object, the present invention provides a shock-absorbing device for a motorcycle. The device comprises a motorcycle handlebar being a tubular body made of firm materials and having a holding section at each of the two terminals thereof, said motorcycle handlebar further including a middle connection section running parallel to the ground; and a shock-absorbing device covering said connection section further comprising a tubular cushion made of soft materials for absorbing shocks and a cover body, said tubular cushion further having a C-shaped cross section and a longitudinal cut that can be expanded to enclose said middle connection section, said cover body consisting of an upper cover and a lower cover made of hard materials and with arced cross sections for coving an outer surface of said tubular cushion.

The various objects and advantages of the present invention will be more readily understood from the following detailed descriptions of three preferred embodiments when read in conjunction with the respective appended drawings.

BRIEF DESCRIPTION OF THE DRAWINGS

FIG. 1-1 is a local enlarged view of the shock-absorbing device for a motorcycle in FIG. 1.

FIG. 4 is an exploded perspective view of the shock-absorbing device for a motorcycle in FIG. 1 wherein the motorcycle and the locking blocks are separated.

FIG. 5 is a perspective view of the shock-absorbing device for a motorcycle in FIG. 1 wherein the motorcycle and the locking blocks are combined.

DETAILED DESCRIPTION OF THE PREFERRED EMBODIMENTS

Figure 1:
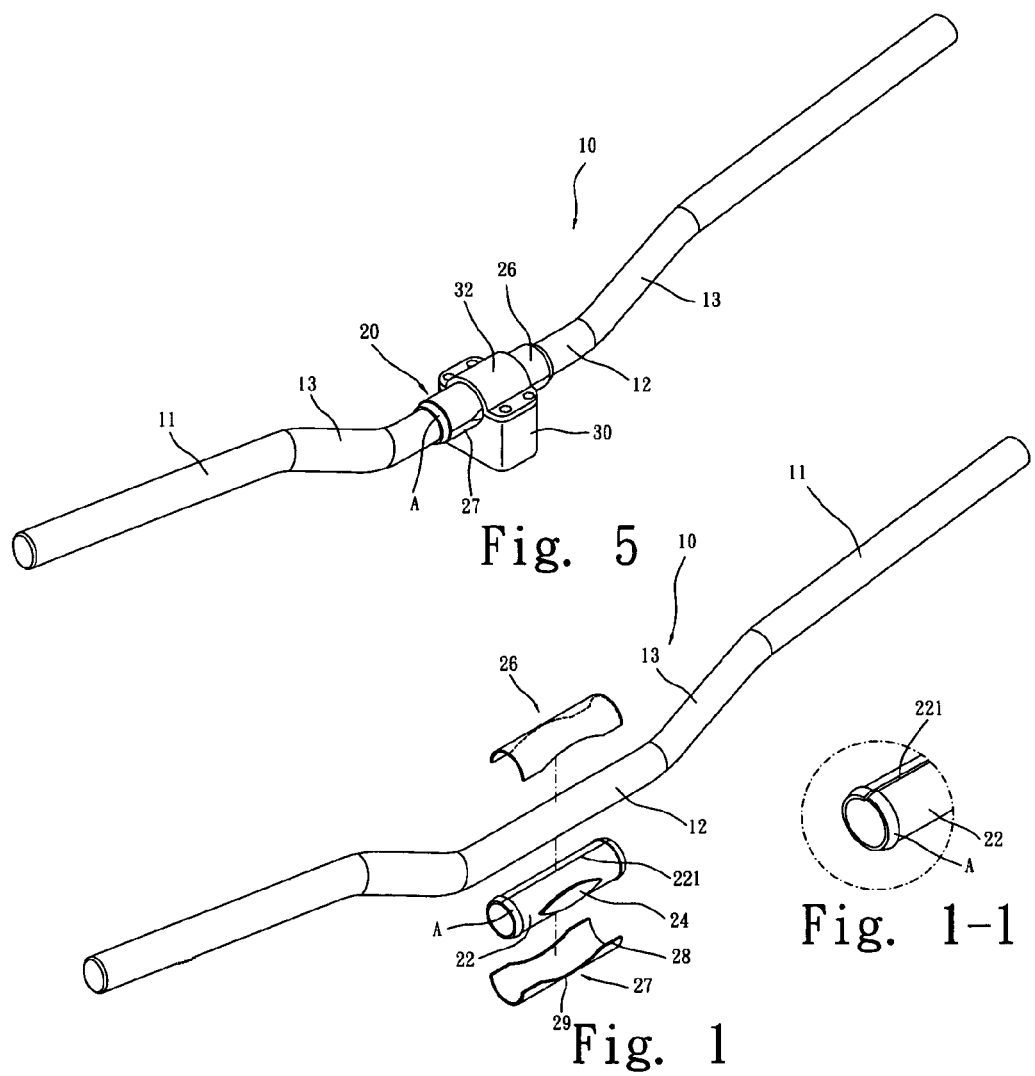
FIG. 1 is an exploded perspective view of a shock-absorbing device for a motorcycle according to the present invention.
Figure 2:
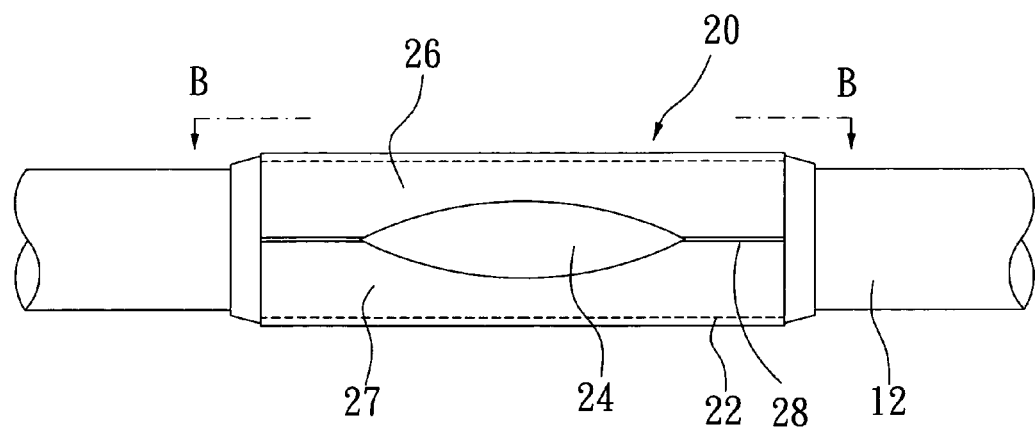
FIG. 2 illustrates the combination of a motorcycle handlebar and the shock-absorbing device for a motorcycle.
Figure 3:
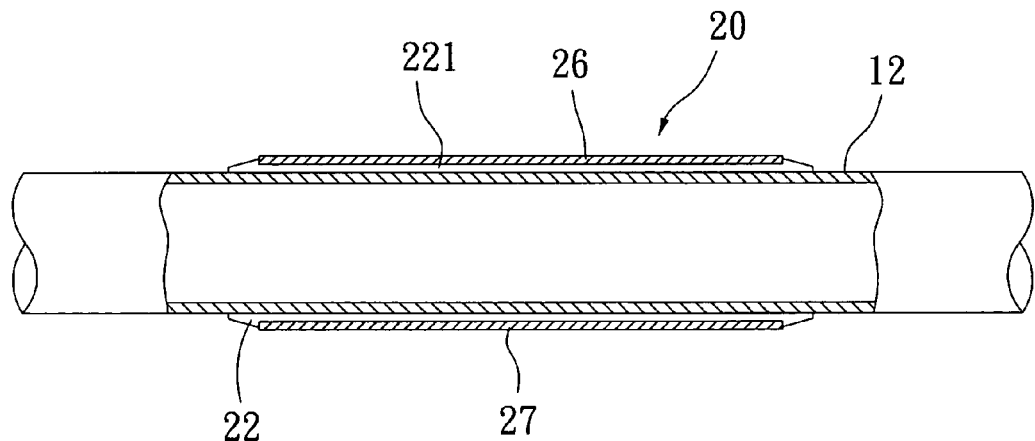
FIG. 3 is the B—B cross sectional view of FIG. 2.

Referring to FIGS. 1 to 3, a shock-absorbing device for a motorcycle according to the present invention comprises a motorcycle handlebar 10 and a shock-absorbing device 20.

The motorcycle handlebar 10 is a hollow tube further comprises a pair of left and right grip sections 11, a middle section 12 and a pair of sloppy connecting sections 13. The motorcycle handlebar 10 forms a horizontal integral body wherein the middle section 12 is connected to the left and right grip sections 11 at its two ends by the pair symmetrically placed sloppy connecting sections 13.

The left and right grip sections 11 are hand grids made of a rubber material (which is the hand grids of the prior art and are therefore not shown in the drawings) not only for absorbing the rebounding force from the ground but also for providing a comfortable and non-slip holding device for the hands.

Figure 8:
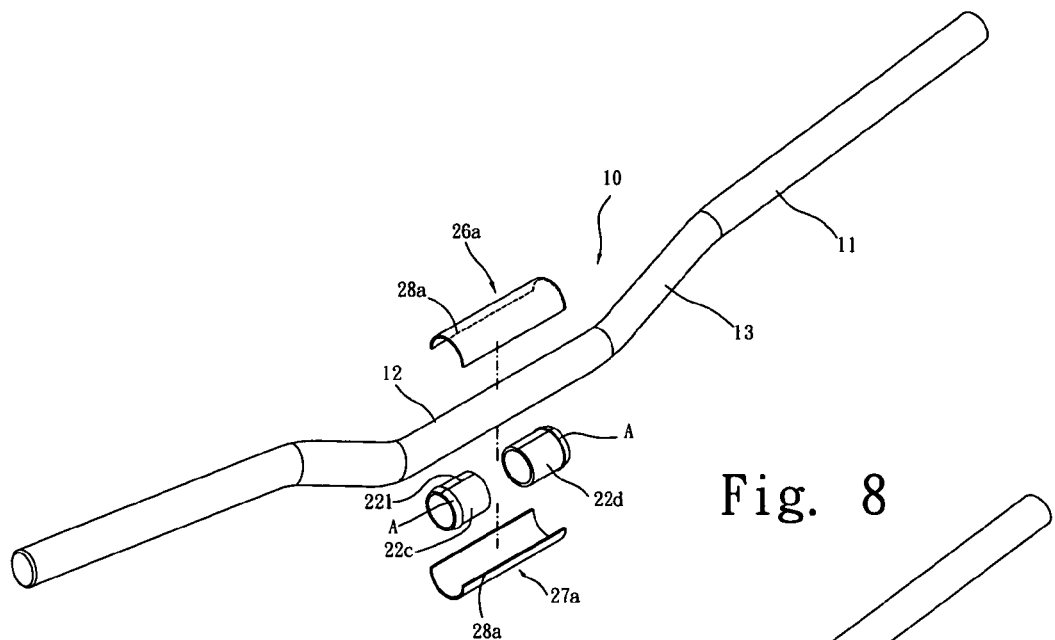
FIG. 8 is a perspective view of the third preferred embodiment of the shock-absorbing device for a motorcycle in FIG. 6 wherein the motorcycle handlebar and the shock-absorbing device are separated.
Figure 9:
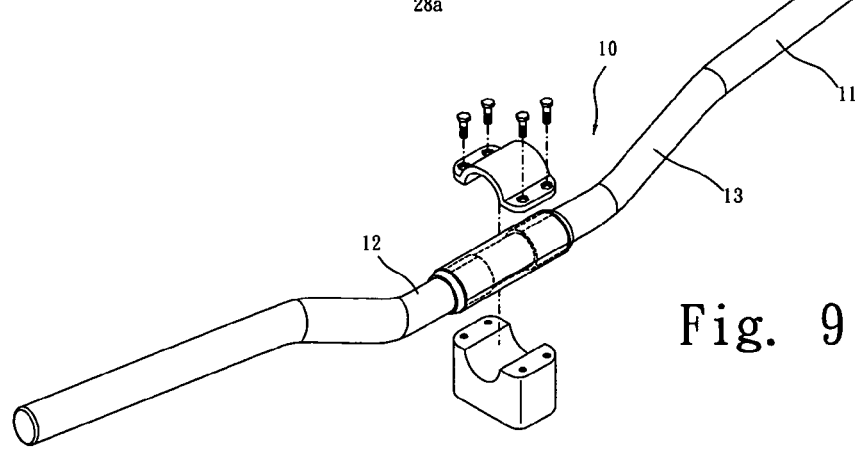
FIG. 9 is a perspective view of the third preferred embodiment of the shock-absorbing device for a motorcycle in FIG. 6 wherein the motorcycle and the locking blocks are separated.

The shock-absorbing device 20 is disposed between the left and right grip sections 11 of the motorcycle handlebar 10, further comprising: a tubular cushion 22 being a hollow body with a pair of stopping flanges A formed at two end faces thereon and made of soft materials having excellent shock absorbing function, such as rubber and plastics. The middle outer surface of the tubular cushion 22 forms an eye-shaped and arced bulge 24. The bulge cane be of any shape, eye-shaped being particularly applied in this preferred embodiment. Also, the outer surface of the tubular cushion can have no bulge at all, as shown in FIGS. 8 and 9.

Further, to connect the tubular cushion 22 to the encircled tubular cushion 22 swiftly, the longitudinal direction of the tubular cushion 22 is provided with a longitudinal cut 221, which is shown in FIG. 1-1. Thereby, the tubular cushion 22 has a C-shaped cross section and the longitudinal cut 221 can be expanded for combing with the middle section 12 of the motorcycle handlebar 10.

The shock-absorbing device 20 may further included a cover body consisting of an upper cover 26 and a lower cover 27 made of a hard material such as carbon fibers, iron, titanium, and magnesium/aluminum alloys. The upper cover 26 and the lower cover 27.

Referring to FIGS. 4 and 5, the shock-absorbing device 20 combined with the middle section 12 of the motorcycle handlebar 10 is sandwiched and secured with a mount 30 and a locking cover 32, as shown in FIG. 5.

Thereby, the middle section 12 of the motorcycle handlebar 10 is provided with a shock-absorbing device 20, so that the recoil force transmitted from the front forked frame as the motorcycle is running over a bumpy road is partially absorbed by the tubular cushion 22 of the shock-absorbing device 20, in addition to the shock absorbing springs and the handgrips. Therefore, the durability of the handgrips is longer.

As for the hard cover body of the soft tubular cushion 22, it can offer the locking blocks a tighter object to hold. Especially, the mount 30 and the locking disk 32 hold the upper cover and the lower cover of the cover body, whereby the arced bulges 24 of the middle arced section 29 will be deformed inwardly and thus the straight sections 28 of the tubular cushion 22 will be brought to form a spherical cover without spacing, as shown in FIG. 5.

The cover body of the present invention consists of an upper cover and a lower cover, wherebetween a slit is reserved for later compressing. Thereby, the slit will disappear upon the compression by the locking device on the cover body and the combination between the cover body and the tubular cushion is tight.

Especially, the middle section 12 of the motorcycle handlebar 10 is provided with a shock-absorbing device 20, so that the recoil force transmitted from the front forked frame as the motorcycle is running over a bumpy road can be effectively absorbed. Thereby, a rider on the motorcycle does not have to tolerate too much shock as he holds the handgrips.

Figure 6:
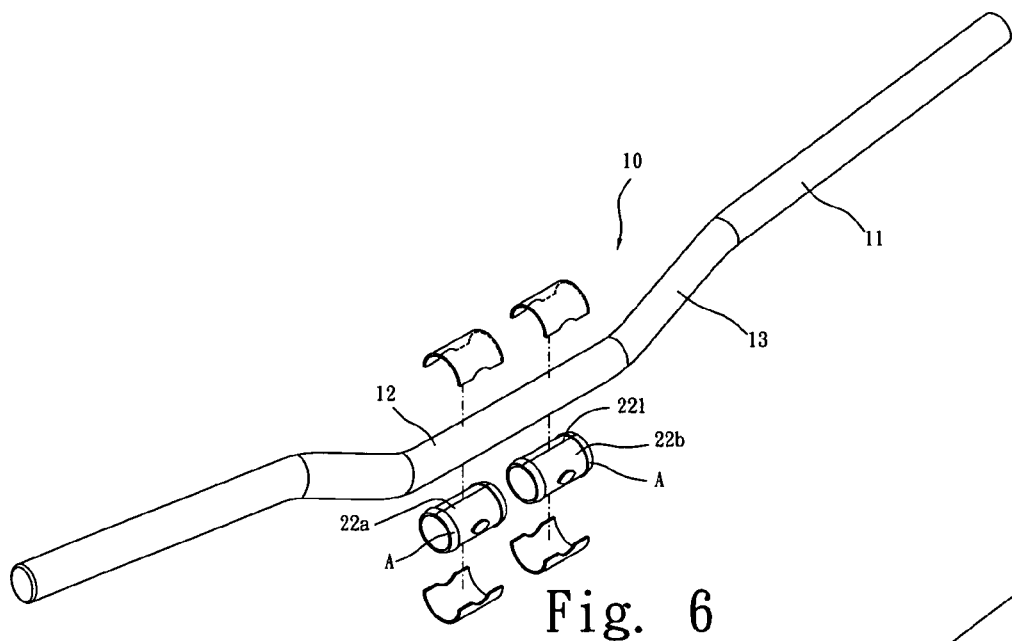
FIG. 6 is a perspective view of the second preferred embodiment of a shock-absorbing device for a motorcycle according to the present invention.
Figure 7:
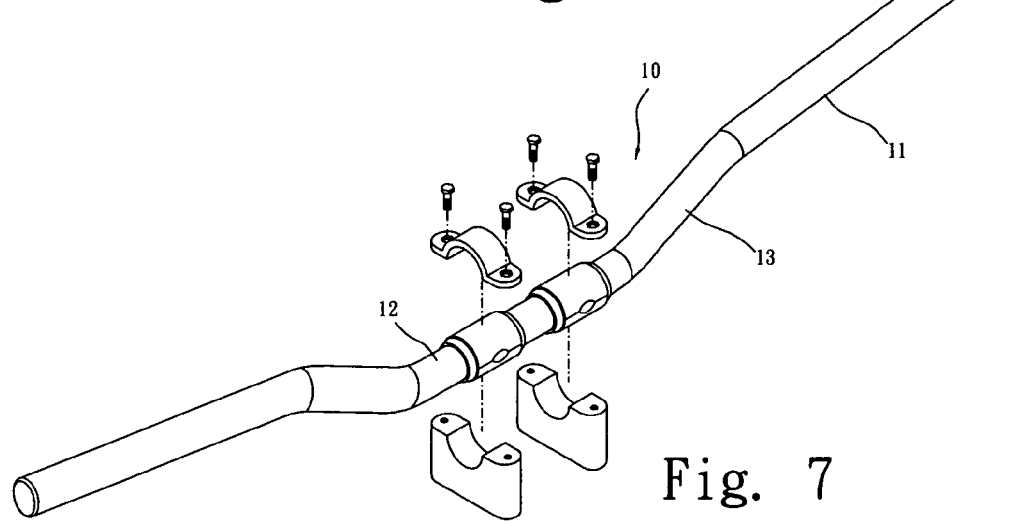
FIG. 7 is a perspective view of the second preferred embodiment of the shock-absorbing device for a motorcycle in FIG. 6 wherein the shock-absorbing device on the motorcycle handlebar and the locking blocks are separated.

Referring to FIGS. 6 and 7, the second preferred embodiment of the present invention as a shock-absorbing device for a motorcycle, which is similar to the above preferred embodiment, ignores the predetermined width of the middle section of the motorcycle handlebar. Instead of a single tubular cushion 22, it comprises a first tubular cushion 22a and a second tubular cushion 22b. Further, the cover body is correspondingly composed of a first cover and a second cover. The above are adhered to each other to form a shock-absorbing device. The shock-absorbing device is connected to a front forked frame by a first locking block and a second locking bloc. The shock-absorbing device consisting of two units of smaller widths can achieve the same shock absorbing effect of the first preferred embodiment, which may save cushion materials.

Referring to FIGS. 8, and 9, the third preferred embodiment of the present invention as a shock-absorbing device for a motorcycle, which is similar to the above preferred embodiment, comprises a first tubular cushion 22c and second tubular cushion 22d without any bulged object provided on the outer surface thereof. The first tubular cushion 22c and second tubular cushion 22d are covered with a cover body consisting of upper and lower covers 26a, 27a each with straight edges 28a. Both of the upper and lower covers 26a, 27a are mounted on a single locking block for achieving the shock absorbing effect.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A shock-absorbing device for a motorcycle; the shock-absorbing device enclosing a middle connection section of a motorcycle handlebar; said motorcycle handlebar being a tubular body made of firm materials and having a holding section at each of two terminals thereof, the shock-absorbing device being sandwiched and secured within a mount and a locking cover; and the shock-absorbing device comprising
   a tubular cushion made of soft materials for absorbing shocks, said tubular cushion further having a C-shaped cross section and a longitudinal cut that can be expanded to enclose said middle connection section;
   a cover body consisting of an upper cover and a lower cover made of hard materials and with arced cross sections for coving an outer surface of said tubular cushion; and
   wherein the shock-absorbing device combined with the middle section of the motorcycle handlebar being sandwiched and secured within a mount and a locking cover;
   wherein each of the lateral ends of said shock-absorbing device is provided with a stopping flange; and
   wherein an outer surface of said tubular cushion is provided with a bulged object of any shape; and the cover body is formed with a hole so that after assembly, the bulged object can protrude out from the hole.

2. The shock-absorbing device for a motorcycle of claim 1 wherein said tubular cushion is made of rubber materials.

3. The shock-absorbing device for a motorcycle of claim 1 wherein said tubular cushion is made of plastic materials.

4. The shock-absorbing device for a motorcycle of claim 1 wherein a lower cover and an upper cover made of magnesium and aluminum alloys are combined to form said cover body.

5. The shock-absorbing device for a motorcycle of claim 1 wherein said lower cover and said upper cover made of carbon fibers are combined to form said cover body.

6. The shock-absorbing device for a motorcycle of claim 1 wherein said lower cover and said upper cover made of titanium are combined to form said cover body.

7. The shock-absorbing device for a motorcycle of claim 1 wherein said lower cover and said upper cover made of metallic iron are combined to form said cover body.

* * * * *